US005557404A

United States Patent [19]
Matsui et al.

[11] Patent Number: 5,557,404
[45] Date of Patent: Sep. 17, 1996

[54] SPECTROPHOTOMETER WITH A SYSTEM FOR CALIBRATING A MONOCHROMATOR

[75] Inventors: Shigeru Matsui; Akira Owada, both of Hitachinaka, Japan

[73] Assignee: Hitachi, Ltd., Tokyo, Japan

[21] Appl. No.: 405,652

[22] Filed: Mar. 17, 1995

[30] Foreign Application Priority Data

Mar. 22, 1994 [JP] Japan ................... 6-050676

[51] Int. Cl.⁶ .................................. G01J 3/18
[52] U.S. Cl. .............. 356/319; 356/328; 356/334
[58] Field of Search .................. 356/319, 326, 356/328, 331–332, 334

[56] References Cited

U.S. PATENT DOCUMENTS

| | | | |
|---|---|---|---|
| 4,779,216 | 10/1988 | Collins | 364/571.02 |
| 4,916,645 | 4/1990 | Wuest et al. | 356/332 |
| 5,268,737 | 12/1993 | Fukuma et al. | 356/334 |

FOREIGN PATENT DOCUMENTS

| | | |
|---|---|---|
| 62-207918 | 9/1987 | Japan . |
| 5-118922 | 5/1993 | Japan . |

OTHER PUBLICATIONS

Grounding and Method of Spectroscopy, pp. 405–413, Ohm Inc. (1985).
Spectrochimica Acta, vol. 39B, No. 7, pp. 867–878, 1984.
Applied Spectroscopy, vol. 45, No. 6, pp. 993–998, 1991.

Primary Examiner—F. L. Evans
Attorney, Agent, or Firm—Kenyon & Kenyon

[57] ABSTRACT

Irregular mechanical imperfections caused by constituent parts of a monochromator in connection with wavelength setting are compensated by calibrating the monochromator according to the present invention. A whole measurable spectral range in the monochromator is divided into a plurality of spectral regions by a plurality of calibration wavelengths. Errors between apparent wavelengths set theoretically and their true wavelengths are obtained with respect to the respective calibration wavelengths. Error functions in connection with the respective spectral regions are calculated on the basis of the array of the obtained errors. An element to be detected in a sample is measured under a wavelength the error of which has been compensated for by use of an error function in a spectral region associated with a wavelength to be detected.

11 Claims, 5 Drawing Sheets

SPECTROPHOTOMETER WITH A SYSTEM FOR CALIBRATING A MONOCHROMATOR

BACKGROUND OF THE INVENTION

The present invention relates to a spectrophotometer with a system for calibrating a monochromator. Particularly the system compensates for mechanical imperfections caused by constituent parts of the monochromator.

Monochromators generally used are described in, "GROUNDING AND METHOD OF SPECTROSCOPY", by Kelei Kudo pp. 405–413, Ohm Inc. (1985). In this related art, a diffraction grating is used as a wavelength dispersing element, and a pulse motor is used as means for driving diffraction grating. The rotation of the diffraction grating is controlled by the feed of a sine bar so as to make the rotation angle of the pulse motor proportional to the wavelength of a monochromatic beam extracted from an exit slit.

In a monochromator, the constituent parts such as a ball screw, a nut, a lever, a diffraction grating, and so on, are manufactured with sufficiently high accuracy, and if the positional relationship therebetween is adjusted properly, only one calibration wavelength is required within a measurable spectral range. If measurement is made as for the position on the ball screw of the nut where the light of the above calibration wavelength can be extracted from the exit slit, the quantity of rotation of the ball screw by which a desired wavelength can be obtained can be decided unequivocally with reference to the above measured position, so that wavelengths can be calibrated.

However, the manufacturing accuracy and the positional relationship of the constituent parts generally have errors to some extent. In monochromators which do not require high accuracy of wavelengths, it is possible to adopt a method in which an average value of errors of a wavelength measured on a plurality of calibration wavelengths is calculated to correct the measured wavelength by use of the calculated error, as disclosed in U.S. Pat. No. 4,779,216.

On the other hand, when higher accuracy wavelength setting is required, a plurality of calibration wavelengths are provided within a measurable spectral range, and errors between wavelength indication values of a monochromator in the respective calibration wavelengths and their real wavelengths are measured. There is used a wavelength calibration method in which a wavelength error function for estimating a wavelength error in a desired wavelength within the measurable spectral range is obtained on the basis of the measured errors, and wavelength indication values of the monochromator are corrected by this wavelength error function. For example, in the wavelength calibration method disclosed in Spectrochemics Acts, Vol. 39B, No. 7, pp. 867–878, 1984 or Applied Spectroscopy, Vol. 45, No. 6, pp. 993–998, 1991, wavelength errors with respect to a plurality of calibration wavelengths are measured to thereby calculate a wavelength error function constituted by a combination of quadratic and trigonometric functions. A measured wavelength is corrected by use of this calculated wavelength error function, so as to correct wavelength errors caused by the mismatching in length of a ball screw or a lever, the mismatching in relative positional relationship between a nut and the lever or the lever and a diffraction grating, or defects on the manufacture of the nut.

Another method to correct an error between a rotation angle indication value of a diffraction grating and its real angle is disclosed in JP-A-5-118922. In this method for measuring an error, light is incident to a monochromator from a light source having a plurality of known calibration wavelengths, and errors between obtained rotation angles of a diffraction grating and their theoretical rotation angles are calculated and stored on a table. When a real wavelength is measured, an obtained rotation angle of the diffraction grating is corrected by the errors stored on the table, and the wavelength of incident light is calculated from the corrected rotation angle.

Although it is not a method for correcting an error in wavelength measurement caused by the accuracy in manufacturing constituent parts or the like, "Apparatus for Automatically Reading Wavelength in a Monochromator" in which wavelength calibration and wavelength initial value setting at the time of turning on the power are performed rapidly by a simple configuration is disclosed in JP-A-62-207918. In this apparatus for automatically reading wavelength in a monochromator, a calibration wavelength $\lambda_c$ is made an initial setting value of a tuned wavelength of the monochromator at the time of turning on the power, and it is detected whether the tuned wavelength of the monochromator is larger or smaller than the calibration wavelength $\lambda_c$. On the basis of the result of detection, the monochromator is scanned in the direction of the calibration wavelength $\lambda_c$, and the value of a wavelength counter is set to the value $\lambda_c$ when the tuned wavelength becomes equal to the calibration wavelength $\lambda_c$. Thus, wavelength calibration and wavelength initial value setting are carried out rapidly.

In the conventional methods for the wavelength calibration of a monochromator, it is assumed that any wavelength error occurs all over the measurable spectral range regularly, so that wavelengths are calibrated by a single wavelength error function the function form of which is known in advance.

It is indeed possible to attain effective correction with the above conventional wavelength calibration methods when a pitch error of a ball screw from its designed value is constant all over the available range of the screw or changes in accordance with an error function the function form of which is known in advance.

Generally, the pitch error of the ball screw is, however, not uniform all over the range. In addition, the pitch error of the ball screw does not always obey a specific function form all over the range even if it does not change suddenly within a narrow range. In such a case, effective calibration cannot be performed by the above conventional methods in which a single wavelength error function is applied to all over the measurable spectral range. The same applies to the defect in flatness of the end surfaces of a lever and a nut which slidably rub against each other in a sine bar mechanism.

SUMMARY OF THE INVENTION

The present invention to provide a spectrometer with a system for calibrating a monochromator so as to properly compensate irregular mechanical imperfections caused by constituent parts of the monochromator at the time of wavelength setting in the monochromator.

According to the invention, a whole measurable spectral range in the monochromator is divided preferably into four or more spectral regions by three or more calibration wavelengths. With respect to the respective calibration wavelengths, errors are obtained between apparent wavelengths set theoretically and real wavelengths thereof, and error functions associated with the respective spectral regions are calculated on the basis of the array of the obtained errors. An element to be detected in a sample is measured under the wavelength the error of which is compensated with the error function associated with the spectral region corresponding to the wavelength to be detected.

The spectrophotometer has a monochromator, a light source, an error storage unit, an error function generation unit, an error function storage unit and a control unit. The monochromator has a diffraction grating and a grating drive assembly. The light source emits a plurality of emission lines for calibrating the monochromator.

The error storage unit stores values of errors between apparent calibration wavelengths obtained when the diffraction grating is positioned in theoretical positions corresponding to respective calibration wavelengths, and real wavelengths of the emission lines obtained when a light beam from the light source is introduced into the monochromator, with respect to the respective calibration wavelengths. The error function generation unit divides a whole measurable spectral range in the monochromator into a plurality of spectral regions by the calibration wavelengths, and generates wavelength error functions with respect to the spectral regions on the basis of the array of the errors associated with the respective calibration wavelengths. The error function storage unit stores the generated wavelength error functions in connection with the respective spectral regions. Of the plurality of spectral regions, the control unit selects a spectral region to which an estimated wavelength for an element to be measured belongs, and the control unit controls the grating drive assembly so as to obtain a position of the diffraction grating compensated by a wavelength error function in the selected spectral region.

Preferably, the error function generation unit eliminates, from the calibration wavelengths, emission lines having light strength smaller than a predetermined level of those detected emission lines from the above light source. Moreover, preferably, the system for calibrating the monochromator calculates spline functions on the basis of the relationships between errors corresponding to calibration wavelengths adjacent to each other, and makes the spline functions wavelength error functions.

Wavelengths to be detected are corrected with the wavelength error functions obtained every spectral region.

As a result, it is possible to compensate for irregular errors which are difficult to apply a single wavelength error function to all over the measurable spectral region, such as a pitch error of a ball screw for moving a diffraction grating, inferiority in flatness between an end surface of a lever for supporting a diffraction grating and an end surface of a nut, which are calibration constituent parts of a monochromator. Accordingly, it is possible to set a detection wavelength with a high accuracy.

DETAILED DESCRIPTION

Figure 1:
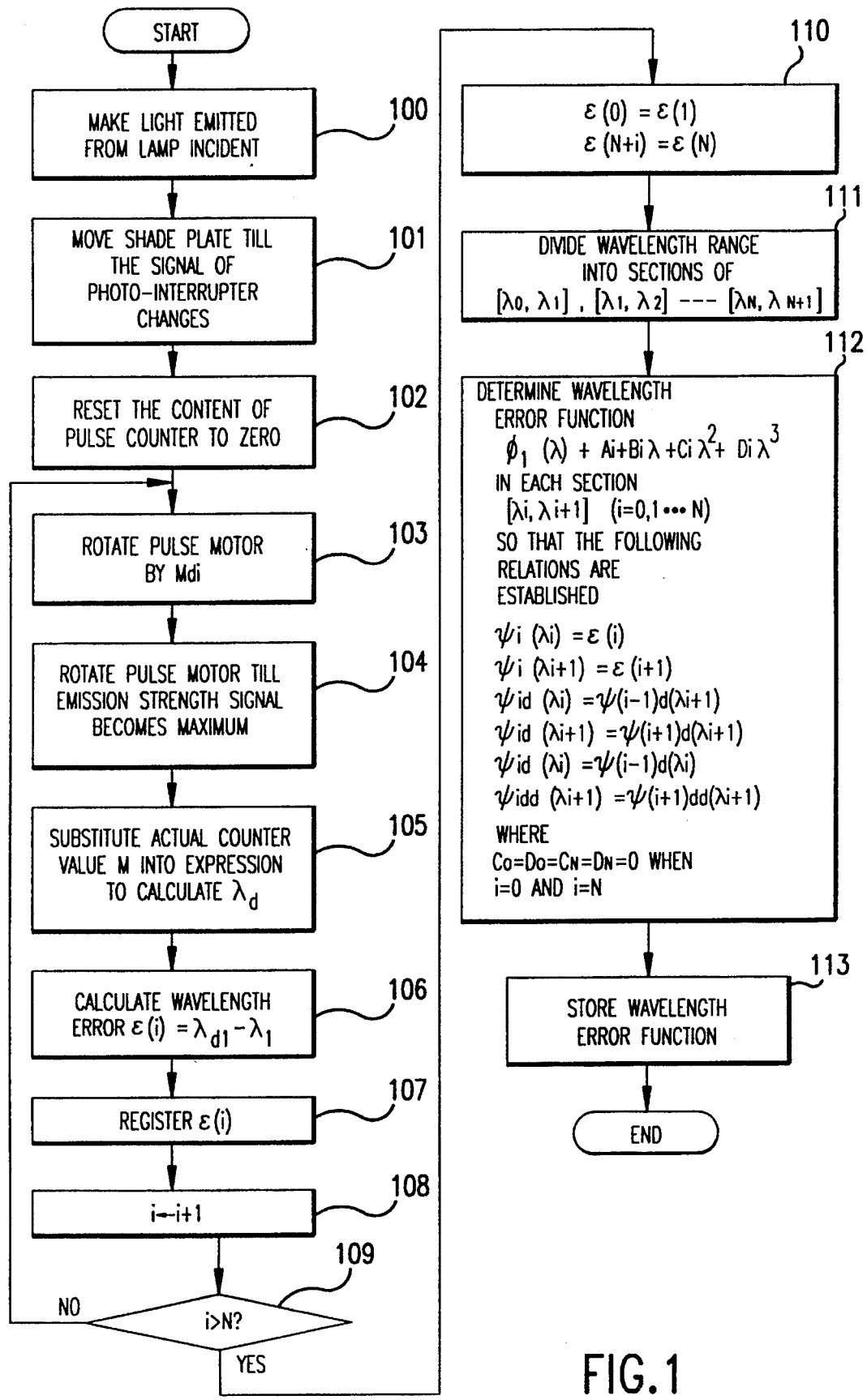
FIG. 1 is a flow chart of operations for calibrating a monochromator in a preferred embodiment.
Figure 2:
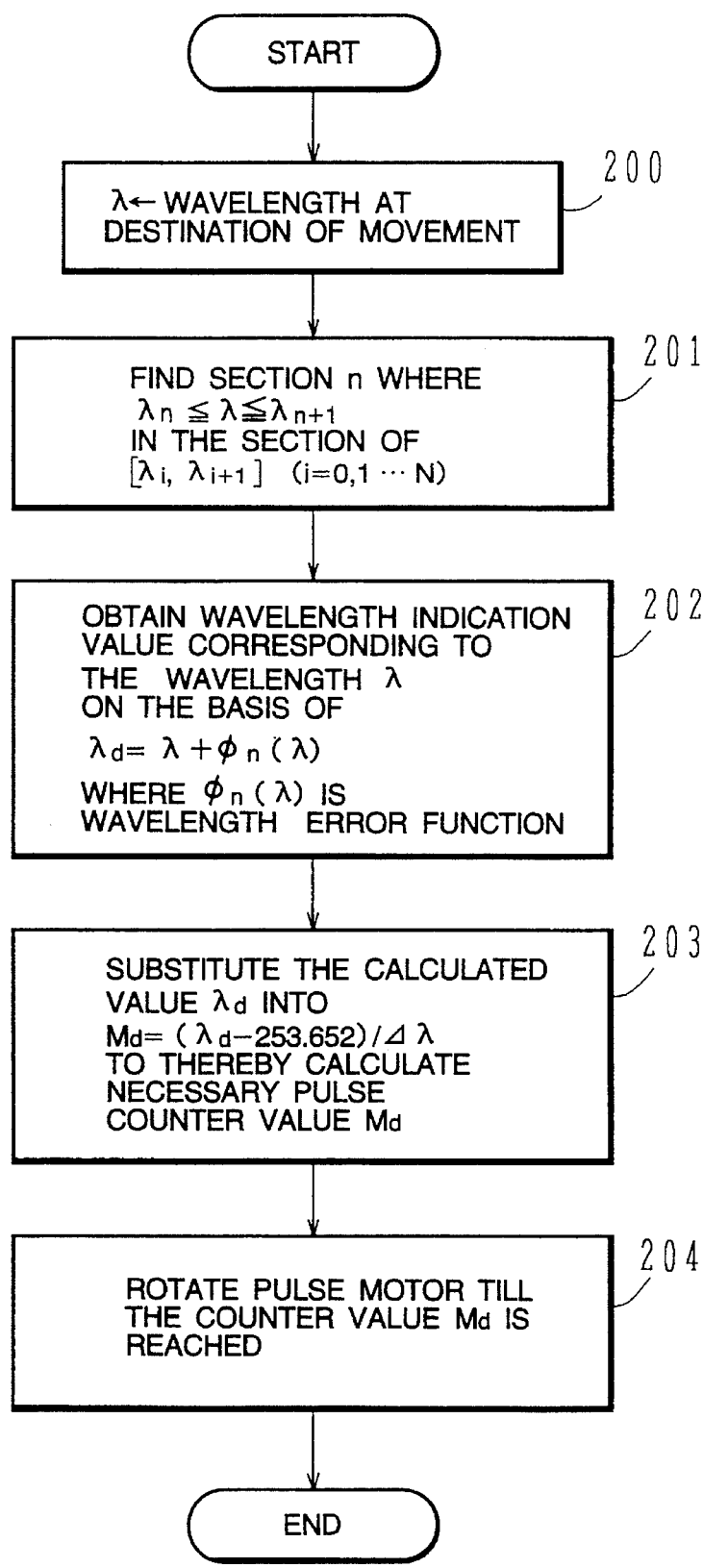
FIG. 2 is a flow chart of operations for setting a wavelength to be measured by use of a wavelength error function obtained by FIG. 1.
Figure 3:
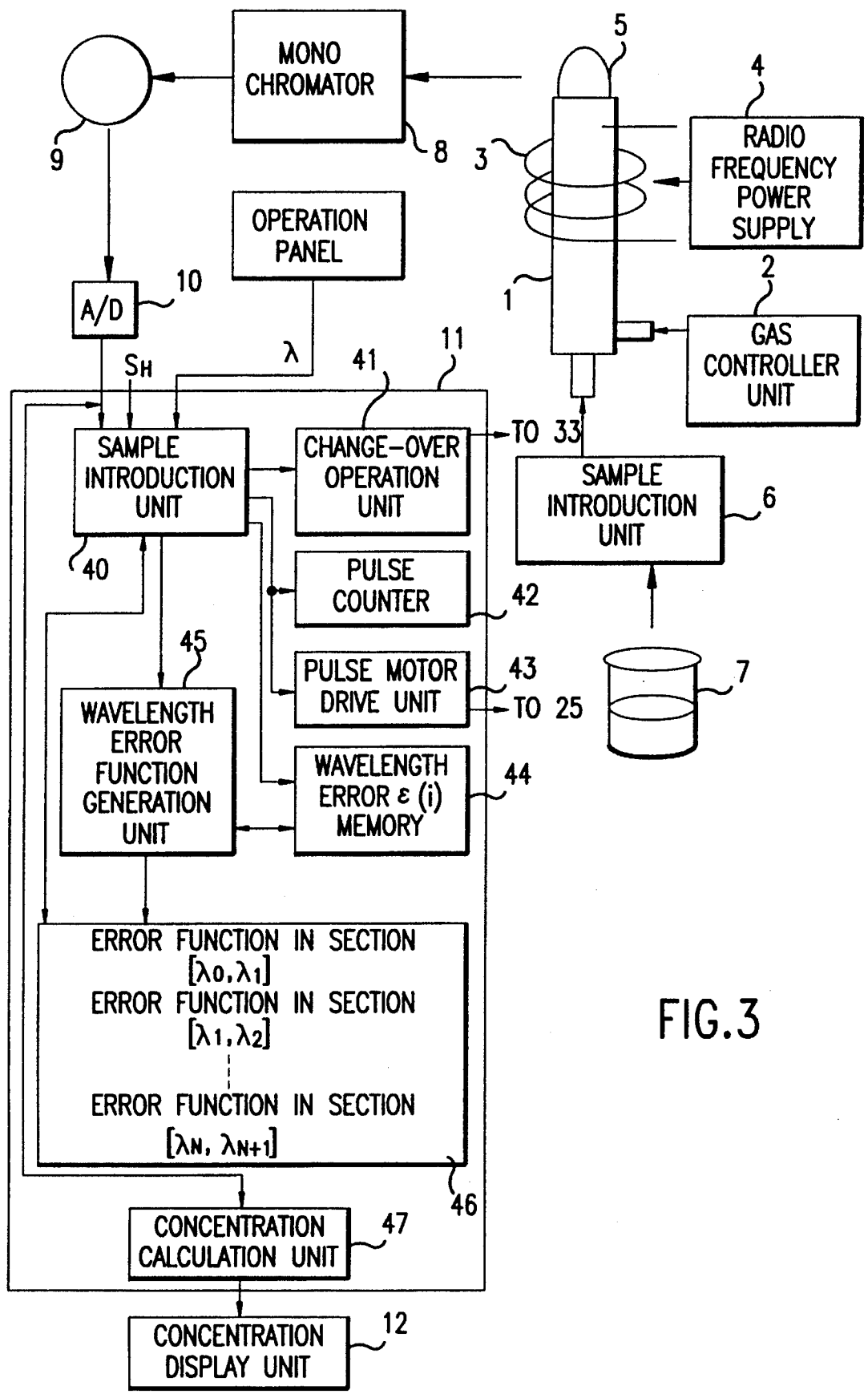
FIG. 3 is a schematic configuration diagram of an inductively coupled plasma atomic emission spectrometer as a preferred embodiment of the present invention.

FIGS. 1 and 2 are operation flow charts showing an embodiment of a wavelength calibration method of a monochromator according to the present invention. FIG. 3 is a schematic configuration diagram illustrating an embodiment of a wavelength calibration apparatus of a monochromator according to the invention. What is shown in FIG. 3 is an example in which the present invention is applied to an inductively coupled plasma atomic emission spectrometer.

In FIG. 3, Ar gas is supplied to a plasma torch 1 from a gas controller 2. A high-frequency induction coil 3 is wound on the upper edge portion of the plasma torch 1, and radio-frequency power is applied to this high-frequency induction coil 3 from a radio-frequency power supply 4, so that an inductively coupled plasma 5 is generated.

On the other hand, a sample solution 7 is supplied to the plasma torch 1 from a sample introduction portion 6, and sprayed into the plasma 5. The sample solution 7 is decomposed in the plasma 5 the temperature of which is so high that emission lines having specific wavelengths are generated correspondingly for respective elements included in the sample solution 7.

These emission lines are monochronized by a monochromator 8, and the emission strength of the emission line having a specific wavelength corresponding to a predetermined element is taken out as an electric signal by a photomultiplier 9. This taken-out electric signal is supplied to an analog-to-digital converter 10 so as to be converted into a digital signal, and then supplied to a data processing portion 11. The data processing portion 11 is constituted by a programmed computer.

The data processing portion 11 has an operation control unit 40, a wavelength error function generation portion 45 controlled by this operation control portion 40 for generating wavelength error functions which will be described later, and a wavelength error function memory 46 for storing the generated wavelength error functions. Further, the data processing portion 11 has a change-over operation portion 41 for operating a change-over mechanism 33 which will be described later, a pulse motor drive unit 43 for driving a pulse motor 25 which will be described later, a pulse counter 42 for counting pulse signals supplied to the pulse motor 25, and a wavelength error memory 44. Further, the data processing portion 11 has a concentration calculation portion 47 which stores in advance a relational expression between a sample concentration and emission intensity and calculates the concentration of an element to be measured in the sample solution 7 on the basis of the fetched emission strength by use of the above-mentioned relational expression.

A signal showing the calculated concentration of the element to be measured is supplied to a concentration display portion 12 by the concentration calculation portion 47. The concentration of the element to be measured in the sample solution 7 is displayed by this concentration display portion 12.

Figure 4:
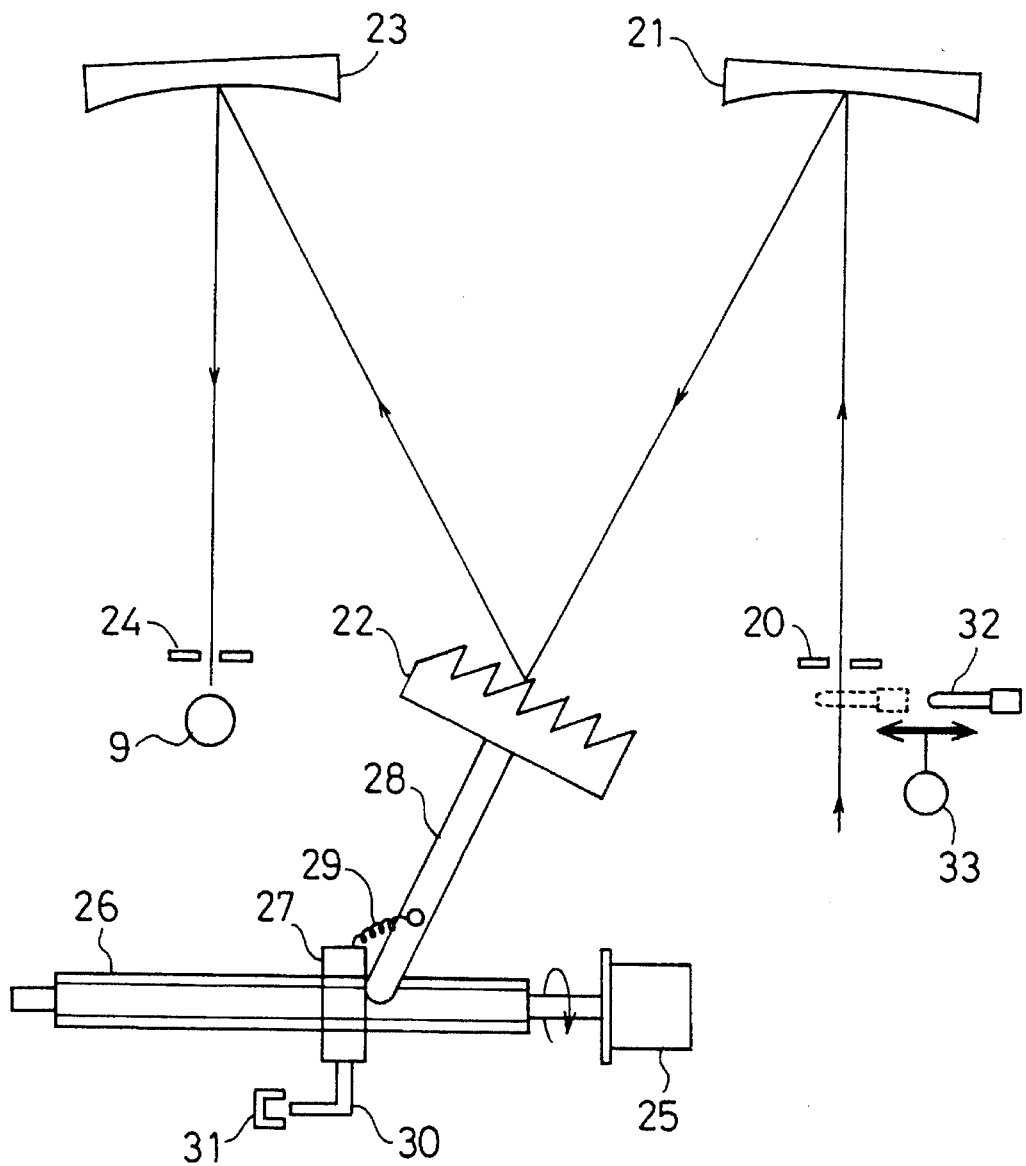
FIG. 4 is a schematic configuration diagram of a monochromator in the spectrometer in FIG. 3.

FIG. 4 is a schematic configuration diagram of the monochromator 8 shown in FIG. 3.

In FIG. 4, an entrance slit 20, a collimating mirror 21, a plane diffraction grating 22 mounted on a rotary table, a camera mirror 23 and an exit slit 24 are arranged in the form of Czerny-Turner mounting. A light beam entering through the entrance slit 20 is collimated light beam by the collimating mirror 21, and then enters the diffraction grating 22. Of the diffracted light beam from the diffraction grating 22, lines having a specific wavelength pass the exit slit 24 through the camera mirror 23, and are detected by the photomultiplier 9.

The diffraction grating 22 is rotated by the rotation of the pulse motor 25, so that it is possible to change the wavelength of light passing the exit slit 24. That is, a ball screw 26 rotates as the pulse motor 25 rotates, and a nut 27 mounted on this ball screw 26 moves on the ball screw 26. One end of a lever 28 is fixed in the center of the rotation of the plane diffraction grating 22, and the other end is pushed onto the nut 27 by a spring 29 so as to slide on the side surface of the nut 27. When the nut 27 moves, the lever 28 also moves, so that the plane diffraction grating 22 is rotated. Accordingly, the wavelength of light passing the exit slit 24 is changed.

A douser 30 is attached to the nut 27, and a photointerrupter 31 is disposed near this douser 30. This photointerrupter 31 is arranged and adjusted to be in such a position that signal change can be given by the douser 30 when the nut 27 moves so that the wavelength of light passing the exit slit 24 becomes 253.652 nm which is a wavelength of a main emission line of a mercury lamp. Thus, the reference position of the nut 27 can be detected easily.

These mechanisms are designed so that the wavelength of light passing the exit slit 24 changes in proportion to the rotation angle of the pulse motor 25. In the example of FIG. 4, they are designed so that the wavelength changes by $\Delta\lambda$ when the pulse motor 25 is rotated by one pulse signal.

The monochromator 8 has a low pressure mercury lamp as a light source giving emission lines (prominent lines) which are to be calibration wavelengths. This lamp is moved by the change-over mechanism 33. This change-over mechanism 33 selectively changes over the light which enters the monochromator 8 between a light beam emitted from the mercury lamp and a light beam emitted from a sample.

The full width of half maximum of emission lines given from the element to be measured and extracted by the monochromator is generally narrow so as to be 0.005 nm or less. In addition, singe a plurality of emission lines occur from one element, a great number of emission lines appear close to each other when a sample includes a plurality of elements. Therefore, high wavelength resolution is required for the monochromator 8, and high wavelength accuracy is also required to take out emission lines of a desired element from these emission lines unerringly.

For this, the data processing portion 11 performs wavelength calibration before the measurement of the sample solution 7 is started. The procedure of wavelength calibration in this embodiment will be described below with reference to the operation flow chart of the wavelength calibration method shown in FIG. 1, and FIGS. 3 and 4.

In Step 100 of FIG. 1, the operation control unit 40 supplies an instruction signal to the change-over operation portion 41 on the basis of an operation start instruction from an operation panel 50 so as to control the operation of the change-over mechanism so that a light beam from the lamp 32 enters the monochromator through the entrance slit 20.

Next, in Step 101, the operation control unit 40 supplies an instruction signal to the pulse motor drive portion 43 so as to rotate the pulse motor 25, and stop the pulse motor 25 in the position where a signal $S_H$ from the photo-interrupter 31 changes by the douser 30. The wavelength of light passing through the exit slit 24 at this time is almost 253.652 nm.

Next, in Step 102, the operation control unit 40 rotates the pulse motor 25 clockwise or counterclockwise through the pulse motor drive portion 43 on the basis of an emission strength signal obtained from the photomultiplier 9. Then, the operation control portion 40 stops the pulse motor 25 in the position where the emission strength signal takes the maximum. This stop position is an accurate position, which is 253.652 nm in a low-pressure mercury lamp, within the accuracy range of unit wavelength in which the pulse motor 25 advances by one step. At this time, the operation control portion 40 resets the content of the pulse counter 42 to zero.

When the pulse motor 25 is rotated in the direction where the wavelength is increased, the number of pulses with which the pulse motor 25 is rotated is added to the content of the pulse counter 42 automatically. When the pulse motor 25 is rotated in the direction where the wavelength is decreased, the number of pulses with which the pulse motor 25 is rotated is subtracted from the content of the pulse counter 42 automatically. That is, the content of the pulse counter 42 at a certain point of time corresponds to the wavelength of light which is passing through the exit slit 24 at this point of time.

The wavelength advances by $\Delta\lambda$ every pulse in the embodiment of FIGS. 3 and 4 as mentioned above. Let the content of the pulse counter 42 be M, and a wavelength value $\lambda d$ obtained by the following expression (1) becomes a wavelength indication value of the monochromator 8.

$$\lambda d = M \times \Delta\lambda + 253.652 \qquad (1)$$

In this embodiment, the measurable spectral range is made to be [$\lambda 0$, $\lambda N+1$], and of the emission lines of the low-pressure mercury lamp 32 including the wavelength 253.652 nm in this measurable spectral range, N emission lines are set as calibration wavelengths in advance. For example, when a mercury lamp is used, the measurable spectral range is from 180 to 800 nm, the number of calibration wavelengths is 11, and the number of divisions is 12. Let the N calibration wavelengths be $\lambda 1, \lambda 2, \ldots \lambda N$ in the order of increasing wavelength. The quantity of rotation of the pulse motor 25 with reference to the position of the wavelength 253.652 nm to thereby obtain these calibration wavelengths can be obtained as a rotation instruction value Mdi (i=1,2, ... N) by the following expression (2) which can be obtained by modifying the above expression (1).

$$Mdi = (\lambda i - 253.652)/\Delta\lambda \qquad (2)$$

Therefore, in Step 103, the operation control portion 40 gives a required number of pulses so as to rotate the pulse motor 25 from the present stop position by the rotation indication value Mdi (providing the initial value of i is 1).

Next, in Step 104, the operation control portion 40 rotates the pulse motor 25 to the position where the emission strength signal supplied from the photomultiplier 9 takes the maximum, so as to seek the peak position of emission lines. The angle position of the diffraction grating when the detected strength signal takes the maximum corresponds to the state where the wavelength of the emission lines passing through the exit slit 24 is a value $\lambda i$ of its true wavelength.

In Step 105, the counter value Mdi obtained in Step 103 is substituted into the expression (1) so as to calculate not only an apparent wavelength indication value $\lambda di$ but also the true wavelength value $\lambda i$ of the emission lines based on the counter value M obtained in Step 104.

Next, in Step 106, the operation control portion 40 calculates a wavelength error $\epsilon(i)=\lambda di-\lambda i$ between the wavelength indication value $\lambda di$ and the real wavelength value $\lambda i$, and in Step 107, registers the calculated wavelength error $\epsilon(i)$ in the wavelength error memory 44 for a first calibration wavelength.

Next, in Step 108, the value in which 1 is added to the above i is set as i. Next, in Step 109, it is determined whether i is larger than N or not. If i is smaller than N, the operation returns to Step 103.

Thereafter, Steps 103 to 109 are executed repeatedly with respect to the values i=2, ... N. Consequently, wavelength errors for the respective calibration wavelengths $\lambda 1, \ldots \lambda N$ are registered in the wavelength error memory 44 as a wavelength error array $\epsilon(1), \epsilon(2), \ldots \epsilon(N)$.

Since no emission lines from the mercury lamp 32 are applicable to wavelength errors $\epsilon(0)$ and $\epsilon(N+1)$ in the both ends $\lambda 0$ and $\lambda N+1$ of the measurable spectral range, the wavelength errors cannot be measured. Therefore, in Step 110, values of wavelength errors in calibration wavelengths which are the closest to the calibration wavelengths $\lambda 0$ and $\lambda N+1$ are adopted as they are, so that $\epsilon(0)=\epsilon(1)$ and $\epsilon(N+1)=\epsilon(N)$ are registered in the wavelength memory 44.

Next, a wavelength error function for estimating a wavelength error in any desired wavelength within the measurable spectral range is obtained from the obtained array $\epsilon(i)(i=1,2, \ldots N)$.

In this embodiment, the wavelength error function is obtained as a cubic spline function.

In Step 111, being supplied with a wavelength error function generation instruction signal from the operation control portion 40, the wavelength error function generation portion 45 first divides the whole measurable spectral range into N+1 spectral regions of $[\lambda 0, \lambda 1], [\lambda 1, \lambda 2], \ldots [\lambda N, \lambda N+1]$.

Next, in Step 112, the wavelength error function generation portion 45 calculates respective coefficients $A_i$, $B_i$, $C_i$ and $D_i$ for every spectral region $[\lambda i, \lambda i+1]$ (i=1,2, ... N−1) so that the following cubic polynomial (3) satisfies the following expressions (4-1) to (4-6). In those expressions, $\psi d i(\lambda)$ and $\psi d d i(\lambda)$ are derivatives of first order and second order of $\psi(\lambda)$, respectively.

$$\psi i(\lambda)=A_i+B_i\lambda+C_i\lambda^2+D_i\lambda^3 \qquad (3)$$

$$\psi i(\lambda i)=\epsilon(i) \qquad (4\text{-}1)$$

$$\psi i(\lambda i+1)=\epsilon(i+1) \qquad (4\text{-}2)$$

$$\psi d i(\lambda i)=\psi d(i-1)(\lambda i) \qquad (4\text{-}3)$$

$$\psi d i(\lambda i+1)=\psi d(i+1)(\lambda i+1) \qquad (4\text{-}4)$$

$$\psi d d i(\lambda i)=\psi d d(i-1)(\lambda i) \qquad (4\text{-}5)$$

$$\psi d d i(\lambda i+1)=\psi d d(i+1)(\lambda i+1) \qquad (4\text{-}6)$$

When i=0 and i=N, the following polynomial (5) of degree one is given for $\psi i(\lambda)$ in the spectral region $[\lambda i, \lambda i+1]$, and coefficients $A_i$ and $B_i$ are calculated to satisfy the following expressions (6-1) and (6-2).

$$\psi i(\lambda)=A_i+B_i\lambda \qquad (5)$$

$$\psi i(\lambda i)=\epsilon(i) \qquad (6\text{-}1)$$

$$\psi i(\lambda i+1)=\epsilon(i+1) \qquad (6\text{-}2)$$

As mentioned above, separate error functions $\psi i(\lambda)$ are calculated for every spectral region $[\lambda i, \lambda i+1]$ (i=0,1, ... N) by the wavelength error function generation portion 45.

Next, in Step 113, the operation control portion 40 makes the wavelength error function memory 46 store the wavelength error functions $\psi i(\lambda)$ (i=0, ... N) generated by the wavelength error function generation portion 45 for every spectral region. Then, the operation of wavelength calibration is completed.

With the wavelength error functions $\psi i(\lambda)$ (i=0,1, ... N) obtained thus, it is possible to estimate a wavelength error in any desired wavelength within the measurable spectral range.

FIG. 2 is an operation flow chart for setting the wavelength of light emitted from the monochromator on the basis of the wavelength error functions $\psi i(\lambda)$ (i=0,1, ... N) calculated thus so that the wavelength is corrected to be the wavelength $\lambda$ of emission lines corresponding to an element to be measured.

In Step 200 of FIG. 2, a value of a wavelength $\lambda$ which is to be detected and for an element to be measured is supplied to the operation control portion 40 by an input means such as the operation panel 50. Since an operator inputs the value of the wavelength on the basis of such consideration that the diffraction grating should be rotated and moved to a proper angle position to give the wavelength $\lambda$ from the monochromator, the system must operate to compensate for errors so as to obtain the proper wavelength.

Next, in Step 201, the operation control portion 40 determines which region of a plurality of spectral regions $[\lambda i, \lambda i+1]$ (i=0,1, ... N) includes the wavelength $\lambda$ which is to be detected. Here assume i=n.

Next, in Step 202, the operation control portion 40 extracts a wavelength error function $\psi n(\lambda)$ associated with the determined spectral region from the wavelength error function memory 46, and calculates a wavelength indication value $\lambda d$ corresponding to the wavelength $\lambda$ which is to be detected, on the basis of the following expression (7). This is an apparent wavelength.

$$\lambda d=\lambda+\psi n(\lambda) \qquad (7)$$

The relationship between the wavelength indication value $\lambda d$ and the content of the wavelength drive pulse counter 42 with reference to the wavelength 253.652 nm is given by the above expression (1). Accordingly, in order to rotate the plane diffraction grating 22 so that a light beam of the wavelength indication value $\lambda d$ can pass the exit slit 24, it will go well if the pulse motor 25 is rotated till the content of the wavelength drive pulse counter 42 becomes Md calculated from the following expression (8).

$$Md=(\lambda d-253.652)/\Delta\lambda \qquad (8)$$

Therefore, in Step 203, the operation control portion 40 substitutes the wavelength indication value $\lambda d$ into the above expression (8) so as to calculate the pulse counter value Md.

Next, in Step 204, the operation control portion 40 rotates the pulse motor 25 through the pulse motor drive portion 43 till the counter value of the pulse counter 42 becomes Md. Consequently, the diffraction grating is set to a proper angle position to obtain the true wavelength $\lambda$.

In the above-mentioned manner, by use of the error functions $\psi i(\lambda)$ (i=0, ... N) set for every spectral region, the emission wavelength of the monochromator 8 is set properly to the wavelength $\lambda$ which is to be detected.

The concentration calculation portion 47 calculates the concentration of an element to be measured, on the basis of an emission strength signal from the photomultiplier 9 when the wavelength of light passing the exit slit 24 is set to the above-mentioned wavelength $\lambda$.

As has been described, according to the method and apparatus for wavelength calibration of a monochromator according to an embodiment of the present invention, a measurable spectral range is divided into a plurality of measurable spectral regions, and the optimum wavelength error function is calculated and stored for every spectral region. Of the stored wavelength error functions, on the basis of the optimum wavelength error function associated with an applicable spectral region, a wavelength indication value λd is calculated, and a plane diffraction grating is rotated, with respect to the wavelength λ to be detected.

It is therefore possible to set a wavelength with a high accuracy even if there is an irregular defect by which it is difficult to apply a single wavelength error function to the whole of a measurable spectral range, such as an error of pitches of the ball screw 26, inferiority in flatness of contact surface between the lever 28 and the nut 27, etc. In addition, in the above embodiment, it is possible to set a wavelength with a high accuracy even if the manufacturing accuracy of constituent parts of the monochromator such as a ball screw, and so on, is lower than the manufacturing accuracy required in a conventional calibration method and apparatus. It is therefore possible to realize a method and an apparatus for wavelength calibration of a monochromator in which inexpensive parts can be adopted, and wavelength can be set with a high accuracy in spite of a low price.

Although wavelength error functions are obtained by use of all of measured values of wavelength errors in N calibration wavelengths in the above embodiment, there is a case where some of these N calibration wavelengths have measured values of wavelength errors in the calibration wavelengths inappropriate to use by such a reason that they do not have enough signal strength at the time of measurement. In this case, the measurement result of the wavelength errors determined inappropriate are abandoned, and the wavelength error functions are obtained from the results in the calibration wavelengths determined appropriate in their measured values.

Figure 5:
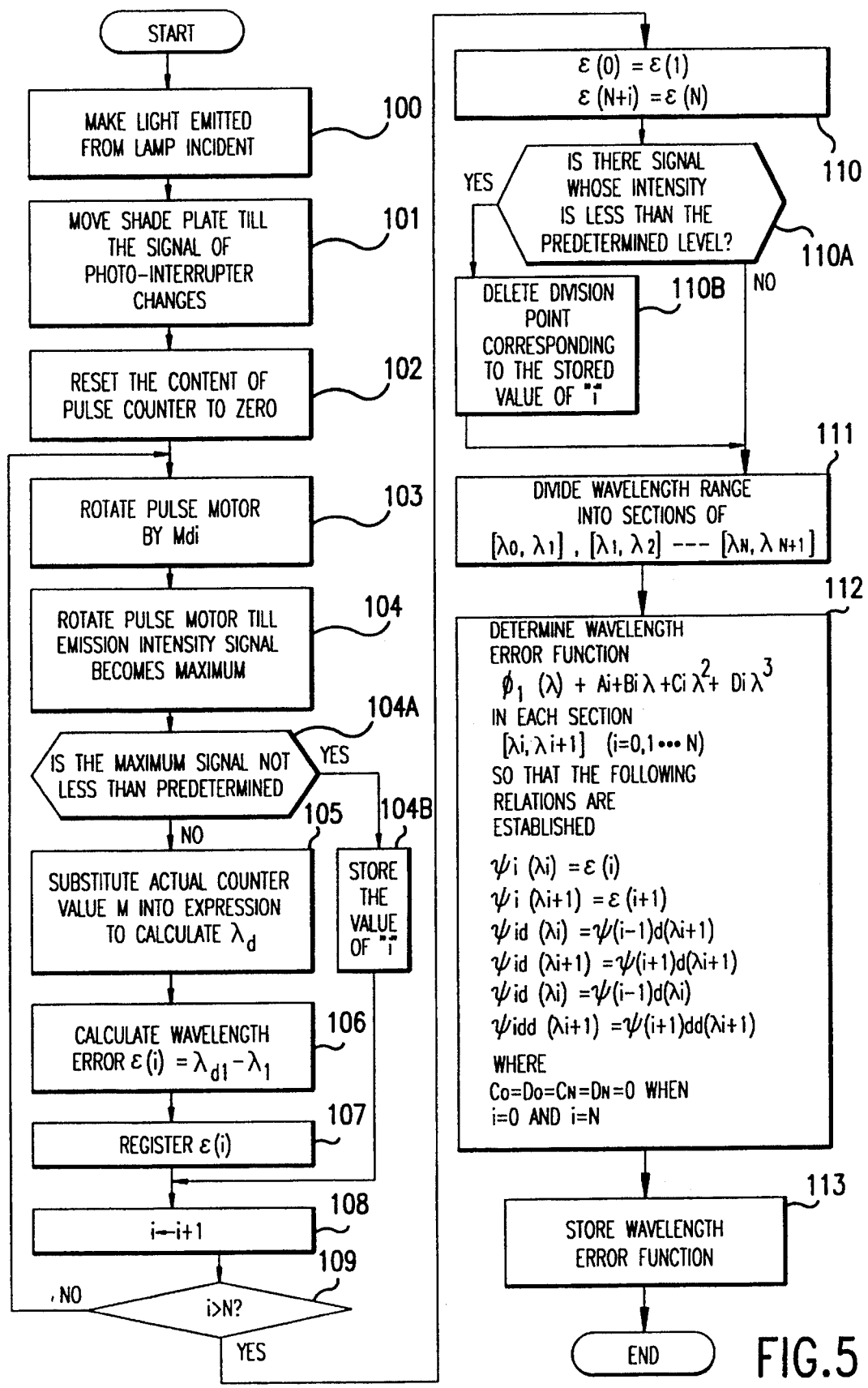
FIG. 5 is a flow chart of operations for calibrating a monochromator in another embodiment of the present invention.

FIG. 5 is an operation flow chart of another embodiment in a wavelength calibration method of the present invention, which is an example of calculating wavelength error functions from results appropriate in measured values as mentioned above. In this embodiment of FIG. 5, Steps 104A, 104B, 110A and 110B are added to the embodiment of FIG. 1, while other steps are the same as those in the embodiment of FIG. 1.

In Step 104A of FIG. 5, the operation control portion 40 determines whether the maximum signal obtained in Step 104 is not less than a predetermined level or not. If the maximum signal is not less than the predetermined level, the operation goes to Step 105. If the maximum signal is less than the predetermined level, go to Step 104B. In Step 104B, the value of i set then is stored in a memory in the operation control portion 40, and the processing is advanced to Step 108. That is, if the maximum signal is less than the predetermined level, wavelength errors are not calculated in this calibration wavelength.

Next, operation advances to Step 110A through Steps 109 and 110, the operation control portion determines whether there was or not a signal whose strength is less than the predetermined level in the previous steps. If there was not any, the operation goes to Step 111. If there was some in Step 110A, the operation goes to Step 110B. In Step 110B, the operation control portion cuts off a division point corresponding to the value of i stored in Step 104B, and the operation advances to Step 111. In Step 111, divided regions are changed and set. That is, although normal spectral regions are [λ0, λ1], ... [λ2, λ3], [λ3, λ4], ... [λN, λN+1], for example, the regions are [λ0, λ1], ... [λ2, λ4], ... [λN, λN+1] when the stored value of i is 3.

Since other steps are the same as those in the embodiment of FIG. 1, the description thereof is omitted.

In this embodiment of the present invention, it is possible to obtain effects similar to those of the embodiment in FIG. 1.

It will go well in the above embodiments if the number of calibration wavelengths in a whole measurable spectral range is three or more.

Although spline functions are used as wavelength error functions in the above embodiments, any other function may be used as the wavelength error functions, without being limited to the spline functions.

Although wavelength error functions are designed to be generated in the data processing portion 11 in the embodiment illustrated in FIG. 3, a suitable wavelength error function generator outside the data processing portion 11 may be used to generate wavelength functions, and make the wavelength error function memory 46 store the thus generated wavelength error functions. In this case, the wavelength error memory 44 and the wavelength error function generation portion 45 are omitted from the data processing portion 11.

Further, although the present invention is applied to a high-frequency inductively coupled plasma atomic emission spectrometer in the embodiment illustrated in FIG. 3, the present invention is not limited to such a high-frequency inductively coupled plasma atomic emission spectrometer, and can be applied to any other spectrometer.

As has been described above, a method and apparatus for wavelength calibration of a monochromator according to the present invention is designed so that a measurable spectral range of light to be detected is divided into a plurality of spectral regions, that separate optimum wavelength error functions are calculated for every divided region, and that a wavelength indication value of the light to be detected is calibrated on the basis of the wavelength error functions calculated for every spectral region.

It is therefore possible to realize a method and apparatus for wavelength calibration of a monochromator which can set a wavelength with a high accuracy even if there is an irregular defect by which it is difficult to apply a single wavelength error function to the whole of a measurable spectral range, such as an error of pitches of a ball screw which is a constituent part, inferiority in flatness of contact surface between a lever and a nut, etc.

What is claimed is:

1. A spectrophotometer with a monochromator having a diffraction grating and a grating drive assembly, comprising:

(a) a light source emitting a plurality of emission lines for calibrating the monochromator;

(b) a wavelength error memory storing, with respect to respective calibration wavelengths, values of errors between apparent calibration wavelengths obtained when the diffraction grating is positioned in theoretical positions corresponding to respective calibration wavelengths, and real wavelengths of said emission lines obtained when a light beam from said light source is introduced into said monochromator;

(c) an error function generator dividing a whole measurable spectral range in said monochromator into a plurality of spectral regions by said calibration wavelengths, and generating wavelength error functions in connection with said respective spectral regions on the basis of the arrangement of said errors associated with said respective calibration wavelengths;

(d) an error function storage device storing said generated wavelength error functions in connection with said respective spectral regions;

(e) a controller selecting, of said plurality of spectral regions, a spectral region to which an estimated wavelength for an element to be measured belongs, and for controlling the grating drive assembly so as to obtain a position of said diffraction grating compensated by wavelength error function in said selected spectral region.

2. A spectrophotometer according to claim 1, further comprising means for moving said light source so that said light beam from said light source is introduced into said monochromator.

3. A spectrophotometer according to claim 1, wherein said light source is a low pressure mercury lamp.

4. A spectrophotometer according to claim 1, further comprising means for energizing a sample in order that an element to be detected in said sample is made luminous.

5. A system for calibrating a monochromator having a diffraction grating and a grating drive assembly, comprising:

(a) a light source emitting a plurality of emission lines for calibrating the monochromator;

(b) a wavelength error memory storing, with respect to respective calibration wavelengths, values of errors between apparent calibration wavelengths obtained when the diffraction grating is positioned in theoretical positions corresponding to respective calibration wavelengths, and real wavelengths of said emission lines obtained when a light beam from said light source is introduced to said monochromator;

(c) an error function generator dividing a whole measurable spectral range in said monochromator into a plurality of spectral regions by said calibration wavelengths, generating wavelength error functions in connection with said respective spectral regions on the basis of the arrangement of said errors associated with said respective calibration wavelengths; and (d) an error function storage device storing said generated wavelength error functions with respect to said respective spectral regions.

6. A system according to claim 5, wherein said light source emits at least three emission lines to calibrate said monochromator, and said error function generator divides said whole measurable spectral range into at least four spectral regions.

7. A system according to claim 5, wherein the grating drive assembly includes a pulse motor.

8. A system according to claim 5, wherein said error function generator generates spline functions as wavelength error functions.

9. A system according to claim 5, wherein said error function generator eliminates, from said calibration wavelengths, emission lines having light strength smaller than a predetermined level of those detected emission lines from said light source.

10. A method for calibrating a monochromator having a diffraction grating and a grating drive assembly, comprising the steps of:

(a) emitting a plurality of emission lines from a light source;

(b) storing values of errors between apparent calibration wavelengths obtained when the diffraction grating is positioned in theoretical positions corresponding to respective calibration wavelengths, and real wavelengths of said emission lines obtained when a light beam from said light source is introduced into said monochromator with respect to respective calibration wavelength;

(c) dividing a whole measurable spectral range in said monochromator into a plurality of spectral regions by said calibration wavelengths, and generating wavelength error functions in connection with said respective spectral regions on the basis of arrangement of said errors associated with said respective calibration wavelengths;

(d) storing said generated wavelength error functions in connection with said respective spectral regions; and (e) selecting a spectral region to which an estimated wavelength for an element to be measured belongs, and controlling the grating drive assembly so as to obtain a position of the diffraction grating compensated by a wavelength error function in said selected spectral region.

11. A method for calibrating a monochromator having a diffraction grating and a grating drive assembly, comprising the steps of:

(a) emitting a plurality of emission lines from a light source;

(b) storing values of errors between apparent calibration wavelengths obtained when the diffraction grating is positioned in theoretical positions corresponding to respective calibration wavelengths, and real wavelengths of said emission lines obtained when a light beam from said light respective calibration wavelength;

(c) dividing the whole measurable spectral range in said monochromator into a plurality of spectral regions by said calibration wavelengths, and generating wavelength error functions in connection with said respective spectral regions on the basis of the arrangement of said errors associated with said respective calibration wavelengths; and (d) storing said generated wavelength error functions with respect to said respective spectral regions.

* * * * *

UNITED STATES PATENT AND TRADEMARK OFFICE
CERTIFICATE OF CORRECTION

PATENT NO. : 5,557,404
DATED : September 17, 1996
INVENTOR(S) : Shigeru Matsui, et. al.

It is certified that error appears in the above-indentified patent and that said Letters Patent is hereby corrected as shown below:

| Column | Line | |
|---|---|---|
| 2 | 55 | Change "to provide" to --provides--. |
| 3 | 63 | Change "FIG. 3; and" to --FIG. 3.--. |
| 4 | 14 | Change "high-frequency" to --radio-frequency--. |
| 5 | 39 | Change "singe" to --since--. |
| 4 | 12 | "high-frequency" should read --radio-frequency--. |

Signed and Sealed this

Third Day of June, 1997

Attest:

BRUCE LEHMAN

Attesting Officer

Commissioner of Patents and Trademarks